Jan. 19, 1954     E. ROLF     2,666,820
SYNCHRONOUS CONTACT DEVICE FOR ELECTRIC CONTACT CONVERTERS
Filed Dec. 3, 1951     2 Sheets-Sheet 1

INVENTOR:
ERICH ROLF
BY C. W. [signature]
ATT'Y

Patented Jan. 19, 1954

2,666,820

UNITED STATES PATENT OFFICE 2,666,820

SYNCHRONOUS CONTACT DEVICE FOR ELECTRIC CONTACT CONVERTERS

Erich Rolf, Nurnberg, Germany, assignor to Siemens - Schuckertwerke Aktiengesellschaft, Berlin-Siemensstadt, Erlangen, Germany, a German corporation Application December 3, 1951, Serial No. 259,607

6 Claims. (Cl. 200—30)

My invention relates to synchronous contact devices for electric contact converters and is described hereinafter with reference to the drawings in which.

Figure 1:
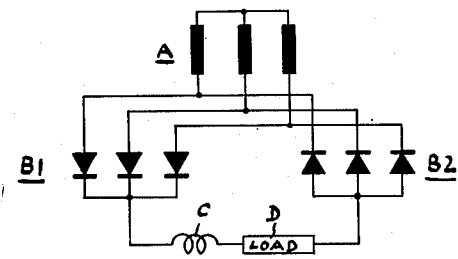
Figs. 1 and 4 show basic circuit diagrams applicable for the invention, while Fig. 2 exemplifies the contact elements of one of the pertaining contact devices.

Contact converters energized from three-phase power supply lines have heretofore predominantly been given a three-phase bridge circuit scheme (Graetz connection) of the type schematically shown in Fig. 1. Each of the three secondaries A of a power supply transformer is connected through two inversely-phased contact rectifier groups B1 and B2 to the respective positive and negative buses of a direct-current output circuit comprising a smoothing reactor C in series with the load D. In Fig. 1, as well as in Fig. 4, each of the mechanically operating contact devices, opening and closing in synchronism with the phase current to be switched, is represented by the symbol of a valve element to also indicate the direction of the current flowing through the contact device during its closing intervals. With such a circuit scheme, the closing interval of each contact device must amount to 120° (electrical degrees) plus an additional overlapping (commutation) interval of a few tens degrees and, hence, totals about 150°. Contact closing intervals of this magnitude can readily be obtained at high accuracy with the aid of a mechanical drive having eccentric-actuated tappets whose movement-versus-time characteristic is sinusoidal.

Figure 2:
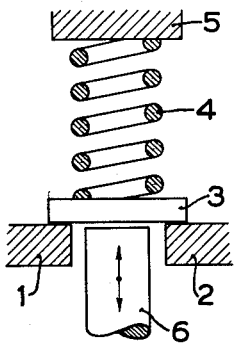

A tappet-actuated contact device of this kind is illustrated in Fig. 2. The device has two stationary contact members 1, 2 and a movable bridge contact member 3 biased toward its closed position by a spring 4 resting against a fixed abutment 5. The contact member 3 is moved upwardly in opposition to spring 4 by means of a vertically reciprocating pusher element or tappet 6. Part of the tappet stroke is idle, the contact member 6 being lifted only when the top face of the tappet rises above the level of the upper faces of the stationary contact members 1 and 2. The stroke movement of tappet 6 is in accordance with a sinusoidal time characteristic as shown in Fig. 3.

Figure 3:
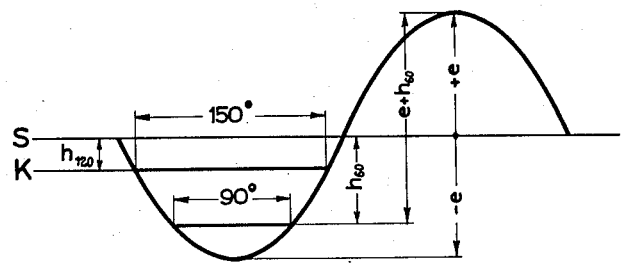
Fig. 3 is a coordinate diagram explanatory of the contact operation.

According to Fig. 3, the sinusoidal half-wave movement of the tappet has an amplitude $e$ so that the total tappet stroke amounts to $2e$. For obtaining the above-mentioned contact closing interval of 150°, the halfway level $S$ of the tappet top face must be a distance of $h_{120}$ higher than the level $K$ of the stationary contact faces. It is apparent that the speed of the movable contact member at the opening and closing moments is still nearly equal to the maximum speed of the tappet.

Figure 4:
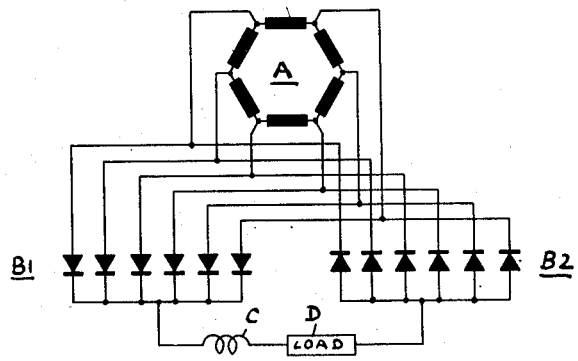

Other circuit schemes such as the six-phase bridge connection according to Fig. 4 (Latour connection) which would offer essential advantages for contact converters over the three-phase bridge connection according to Fig. 1, require a contact closing interval of only 60° plus an overlapping interval, amounting to a total of about 90°. A closing interval of such a short duration can no longer be satisfactorily obtained with a sinusoidal tappet movement. It will be seen from Fig. 3 that for securing such a short closing interval a much larger level difference of $h_{60}$ would have to be chosen. This would result in much slower closing and opening speeds for the same tappet structure and, hence, can no longer secure a satisfactory accuracy of the switching performance. Sufficient contact speeds can be reached if the tappet structure is increased considerably. This, however, leads to excessively high mechanical stresses, particularly of the contact spring (4 in Fig. 2), because the distance of spring deflection $e+h_{60}$ is then increased to a multiple. It has been proposed to obtain short contact closing intervals without detrimental enlargement of the tappet stroke by driving the tappets from curved cam disks with steep cam flanks instead of from the above-mentioned eccentric drives. Such cam disks, however, are subject to considerable wear at the high operating speeds required for the converters.

It is an object of my invention to provide a contact device for contact converters which, though driven by an eccentric of sinusoidal movement, affords an increased contact speed at the opening and closing moments while avoiding a detrimental increase in deflective movements of the contact springs. More particularly, it is an object of the invention to provide reliable contact devices capable of satisfactory operation in contact converters of extremely short closing intervals for instance of about 60°.

To attain these objects and in accordance with my invention I interpose, between an eccentric drive of sinusoidal movement and the movable contact to be driven therefrom, a transmission whose output motion has a time characteristic departing from the sinusoidal law. This characteristic has a larger than sinusoidal rate of change at the opening and closing moments without appreciable increase in spring deflection. This can be achieved by the superposition of at least two sinusoidal movements of different respective frequencies.

According to another feature of my invention, the sinusoidal motion of the driving eccentric, occurring at a base frequency corresponding to that of the current to be interrupted, is combined with a superimposed sinusoidal motion of doubled frequency produced by another eccentric, the superposition being such that during one half-wave of the base frequency the tappet stroke is increased, while during the other half-wave the stroke is decreased. The increase in stroke acts in the sense of an increase in contact speed. The stroke reduction during the other half wave acts toward limiting the spring deflection.

Figure 5:
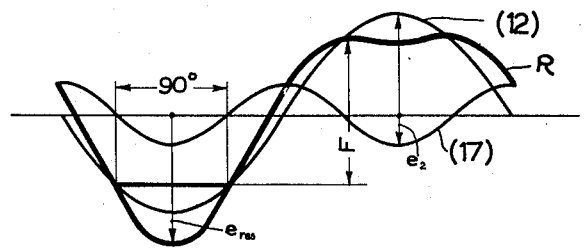
Fig. 5 shows another coordinate diagram and is explanatory of the operation of a contact device according to the invention, an embodiment of such a device being illustrated in Fig. 6.

The foregoing will be further understood from the diagram of Fig. 5. This diagram shows the superposition of a sinusoidal motion (12) of the base frequency by a likewise sinusoidal motion (17) of twice the base frequency. The resultant motion of the driving elements for the movable contact is denoted by curve R. If the switching speed of the movable contact and the deflection of the biasing spring are assumed to be equal to the respective magnitudes occurring in the 120° scheme (Figs. 1 and 3), then the amplitude of movement of the driving elements operating at the base frequency amounts to 84.5% of the corresponding amplitude occurring under the conditions represented in Fig. 3, and the amplitude of the movement at the double frequency amounts to only 18.5%.

Figure 6:
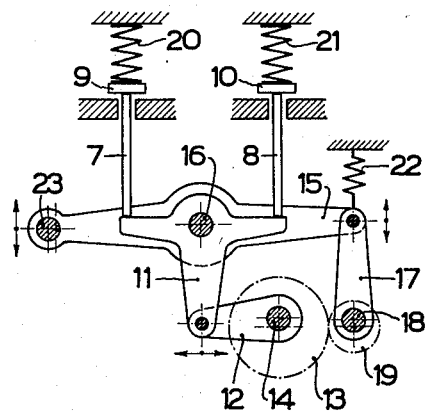

The embodiment exemplified in Fig. 6 incorporates the just-mentioned performance features. In this embodiment both sinusoidal components of the contact driving motion are produced by eccentrics, the eccentric for the doubled frequency having twice the revolving speed of the eccentric for the base frequency.

The contact device according to Fig. 6 has two inversely operating pusher elements designed as tappets 7 and 8 for actuating the respective movable contacts 9, 10 located above the tappet top faces. The transmission upon the tappets of the sinusoidal movement at the base frequency is effected by means of a three-armed angular lever 11 driven by a link 12 from an eccentric 14 which may be mounted on the shaft of a synchronous motor (not illustrated). In order to have the angular lever 11 also transmit to the tappets a movement of twice the base frequency, the lever is pivoted at 16 on an oscillatory arm 15. Arm 15 has a pivot at 23 and is driven by a link 17 to reciprocate about pivot 23 at twice the base frequency. Movement is imparted to link 17 by an eccentric 18 revolving at twice the speed of the motor. For this purpose, the eccentric 18 may be coupled with the motor shaft through spur gears 13, 19 of a 2:1 transmission ratio. For releasing the eccentric 18 of the pressure of contact springs 20, 21 an additional spring 22 may be provided. This spring 22 is shown to operate as an expansion spring although a compression spring may be used instead.

If a regulation of the overlap (commutation) intervals of the contact closing periods is required, the pivot 23 may preferably be designed as an eccentric. By turning the journal shaft of this eccentric the elevation of the pivot point is displaced in a direction parallel to the contact movements thus decreasing or increasing the contact closing interval in accordance with any desired requirements.

It will be recognized that in Fig. 5 the sinusoidal curve (12) corresponds to the motion of the link 12 in Fig. 6, while the sinusoidal curve (17) of twice the frequency corresponds to the motion of link 17. The resultant curve R corresponds to the movement of the tappet 7 or 8. It will be seen that during the first half wave the tappet stroke is enlarged to the value $e_{res}$. Consequently, the contact speed at the closing and opening moments is considerably larger than the contact speed corresponding to the sinusoidal motion (12) at the base frequency. During the second half wave, however, the resultant tappet stroke is diminished by the amount $e_2$ over that occurring with a motion at the base frequency. For instance, by suitably dimensioning the eccentrics 14 and 18, it can readily be achieved that the resultant distance F of spring deflection according to Fig. 5 is not larger for a 60° scheme than the spring deflection $e + h_{120}$ according to Fig. 3 for a 120° scheme. It should be remembered that the diagrams of Figs. 3 and 5 indicate the total contact interval (about 150° and 90° respectively) including the overlap (commutation) interval.

It will be obvious to those skilled in the art upon a study of this disclosure that my invention is not limited to the specific embodiment illustrated in Fig. 6 but may also be applied to other mechanisms for the transmission and superposition of movements which modify the sinusoidal motion of a driving eccentric into a non-sinusoidal output motion in the sense of an increased contact speed at the opening and closing moments and a decreased deflection of the contact springs.

I claim:

1. Contact apparatus for electric contact converters, comprising stationary contact means, a contact member reciprocable between closing and opening positions relative to said stationary contact means, spring means engaging said member for biasing it to said closed position, a pusher element reciprocable toward and away from said contact member and being in engagement therewith along a portion of the reciprocating travel of said element to move said member between said positions, two revolvable eccentrics of sinusoidal movement and respectively different speeds of revolution, and mechanism means joined with said two eccentrics for superimposing their respective movements and being joined with said pusher element to impart resultant movement thereto.

2. Contact apparatus for electric contact converters, comprising stationary contact means, a contact member reciprocable between closing and opening positions relative to said stationary contact means, spring means engaging said member for biasing it to said closed position, a revolvable eccentric of sinusoidal movement, a transmission mechanism inputwise in engagement with said eccentric and having an output element reciprocable toward and away from said contact member and being in engagement therewith along a portion of the reciprocating travel of said element to move said member between said positions, and drive means of sinusoidal movement and twice the frequency of said eccentric, said drive means being joined with said mechanism to superimpose said two sinusoidal movements upon said output element so that the travel of said element is longer than sinusoidal during one half revolution of said eccentric and shorter than sinusoidal during the other half revolution.

3. Contact apparatus for electric contact converters, comprising stationary contact means, a contact member reciprocable between closing and opening positions relative to said stationary contact means, spring means engaging said member for biasing it to said closed position, a pusher element reciprocable toward and away from said contact member and being in engagement therewith along a portion of the reciprocating travel of said element to move said member between said positions, a swing arm having a normally stationary pivot, an intermediate part fulcrumed on said arm at a point spaced from said pivot and engaging said pusher element to impart movement thereto, a first drive of sinusoidal motion linked to said part to oscillate it at a base frequency of a given value, and a second drive of sinusoidal motion linked to said arm and having a frequency of twice said value.

4. In contact apparatus according to claim 3, said two sinusoidal-motion drives having respective eccentrics, and a gear transmission interconnecting said eccentrics at a fixed mutual phase relation at which the travel of said pusher element is longer than sinusoidal during one half wave of said base frequency and shorter than sinusoidal during the other half wave.

5. Contact apparatus for electric contact converters, comprising stationary contact means, a contact member reciprocable between closing and opening positions relative to said stationary contact means, spring means engaging said member for biasing it to said closed position, a tappet reciprocable toward and away from said contact member and being in engagement therewith along a portion of the reciprocating travel of said element to move said member between said positions, a swing arm having a normally stationary pivot, an intermediate part fulcrumed on said arm at a point spaced from said pivot and engaging said tappet to impart movement thereto, first eccentric drive means of sinusoidal motion having a link pivoted to said part to oscillate it about said fulcrum at a frequency of a base value, second eccentric drive means of sinusoidal motion having a frequency of twice said value, said second drive means having a link pivoted to said arm at a point spaced farther from said pivot than said fulcrum point for oscillating said arm to superimpose said latter frequency upon said tappet, and transmission means interconnecting said two eccentric drive means in a fixed phase relation to each other.

6. Contact apparatus for electric contact converters, comprising stationary contact means, a contact member reciprocable between closing and opening positions relative to said stationary contact means, spring means engaging said member for biasing it to said closed position, a revolvable eccentric of sinusoidal movement, an oscillatory arm having a fixed fulcrum axis and being linked to said eccentric to be oscillated thereby, an oscillatory structure pivoted on said arm at a point spaced from said axis, oscillatory drive means linked with said structure and having a higher speed than said arm, said structure being engageable with said contact along only a portion of the reciprocating travel of said structure to move said member between said positions, said structure having a movement of a higher than sinusoidal rate of change at the opening and closing moments of said member and having a shorter than sinusoidal travel during engagement with said member.

ERICH ROLF.

References Cited in the file of this patent

FOREIGN PATENTS

| Number | Country | Date |
|---|---|---|
| 857,748 | France | Apr. 22, 1940 |